(12) United States Patent
Johri et al.

(10) Patent No.: US 8,018,876 B2
(45) Date of Patent: Sep. 13, 2011

(54) ROUTING SYSTEM AND METHOD WITH OSPF AREA ZERO SPLIT INTO A TWO LEVEL HIERARCHY FOR ROUTE CALCULATION

(75) Inventors: Pravin Kumar Johri, Aberdeen, NJ (US); Sanj Durinovic-Johri, Aberdeen, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 208 days.

(21) Appl. No.: 12/228,816

(22) Filed: Aug. 15, 2008

(65) Prior Publication Data

US 2010/0040069 A1 Feb. 18, 2010

(51) Int. Cl.
H04L 12/28 (2006.01)
H04L 12/50 (2006.01)
H04L 12/56 (2006.01)
(52) U.S. Cl. .................... 370/255; 370/400
(58) Field of Classification Search .............. None
See application file for complete search history.

(56) References Cited

U.S. PATENT DOCUMENTS

| 6,950,424 | B2 | 9/2005 | Galand et al. | |
|---|---|---|---|---|
| 7,457,277 | B1* | 11/2008 | Sharma et al. | 370/351 |
| 2007/0121503 | A1* | 5/2007 | Guo et al. | 370/230 |
| 2007/0297799 | A1* | 12/2007 | Tse-Au | 398/58 |

FOREIGN PATENT DOCUMENTS

| FR | EP 1185041 A2 * | 6/2002 |
|---|---|---|
| WO | WO 98/19425 * | 5/1998 |

OTHER PUBLICATIONS

S. Mirtorabi, P. Psenak, A. Lindem, A. Oswal, "OSPF Multi-Area Adjacency", The IETF Trust, draft-ietf-ospf-multi-area-adj-07.txt, Sep. 2007.
D. Papadimitriou, "OSPFv2 Routing Protocols Extensions for ASON Routing", The IETF Trust, draft-ietf-ccamp-gmpls-ason-routing-ospf-03.txt, Sep. 2007.
L. Ong, "Draft OIF Specification for E-NNI Routing using OSPF (Restructured)", Cont. # OIF2005.313.05, Ciena Corp., Optical Internetworking Forum, Jun. 2006.
E. Rosen et al., "OSPF as the Provider/Customer Edge Protocol for BGP/MPLS IP Virtual Private Networks (VPNs)", The Internet Society, http://www.ietf.org/rfc/rfc4577.txt?number=4577, Jun. 2006.
L. Ong, J. Sadler "External Network-Network Interface (E-NNI) OSPF-based Routing—1.0 (Intra-Carrier) Implementation Agreement" Optical Internetworking Forum, http://www.oiforum.com/public/documents/OIF-ENNI-OSPF-01.0.pdf, Jan. 2007.

* cited by examiner

Primary Examiner — Chirag G Shah
Assistant Examiner — Jenkey Van

(57) ABSTRACT

A method and system for routing traffic in an IP network using OSPF protocols and including core and hub routers in area zero. The core and hub routers are assigned different node signatures depending on whether the router is a core router or a hub router and link signatures match the node signatures. Internode traffic (core to core, hub to core, and hub to hub) is configured with routing algorithms separately for node and link network segments for which node and link signatures include core signatures as well as those of the internode pair selected. The OSPF routing for the separate network segments is then used to route traffic over the network. An IP network so configured will not route core traffic over hub links during periods of core element failure or downtime, and suffer packet loss.

13 Claims, 9 Drawing Sheets

ROUTING SYSTEM AND METHOD WITH OSPF AREA ZERO SPLIT INTO A TWO LEVEL HIERARCHY FOR ROUTE CALCULATION

FIELD OF THE INVENTION

The present invention generally relates to OSPF routing in IP networks, and more particularly to a system and method for reducing packet loss in such networks.

BACKGROUND OF THE INVENTION

A typical IP network employs a plurality of routers, connected by links, to route data packets representing information (e.g., a telephone call using VoIP (voice over Internet Protocol)) independently from an origin to a destination based on a destination address in each packet. IP networks of the type described above are characterized by best effort routing, and an example of routing that is prevalent is the Open Shortest Path First (OSPF) protocol. Other routing protocols are often derived from OSPF routing. For example, LSPs (Label Switched Paths) are created using the MPLS (Multi Protocol Label Switching) protocol on the routes derived from the OSPF protocol, and an IP packet is transmitted by attaching one or more MPLS labels, corresponding to the respective LSP, to the IP packet. Thus in referring to OSPF protocols in this application, we mean to embrace other named protocols that build on OSPF routing solutions.

In the OSPF protocol, routers within the network exchange information with each other by a flooding technique so that each router maintains a database of the network topology. Using the information in its stored database, each router selects a path to all other routers in accordance with user-established cost metrics that typically require the shortest possible path. Data packets are forwarded based on the destination IP address in the packet along the path selected to the router that can reach the destination IP address either directly or via another network or sub-network. When multiple choices are available, the path with the minimum cost metric is selected. Using such cost metrics, each router establishes its routing table accordingly so each router can select a path having, for example, a minimum number of links.

It is desirable with any routing scheme to avoid packet loss, which requires information to be resent and places added demands on network capacity. As explained below, OSPF routing is vulnerable to packet loss in certain situations.

A normally configured OSPF network has a two-level hierarchy partitioned into multiple areas. "Area zero" is always assigned to the core OSPF network and defines the higher level of the hierarchy. Area IDs >0 are assigned to all other areas and they belong to the lower level of the hierarchy. These areas are referred to as "area ones". Area zero must be contiguous and all area ones must attach to area zero. The OSPF hierarchy and areas are used to limit the flooding of OSPF Link State Advertisement (LSA) messages (messages are flooded only to nodes in the same area) as well as to constrain how routes are calculated and how traffic flows between two nodes (traffic between routers in an area must stay on links in that area, e.g., area zero traffic cannot dip down into area ones). Within an area, routes are calculated using the Dijkstra shortest path algorithm, which calculates the shortest routes from a source node to all other (destination) nodes in one pass of the algorithm. Shortest path routing is required for all traffic within an area, even if it exceeds link capacities resulting in packet drops (accordingly, it is the responsibility of network administrators to see that links have adequate capacity). Traffic can pass between areas only through an area border router (ABR), a router with links in more than one area. The ABR summarizes reachability information (sets of reachable IP addresses and costs) in an area and sends it to other areas.

The Dijkstra algorithm is used within each area and operates on an administrative weight parameter assigned to each link in that area. In reality, each link is a bidirectional link with an administrative weight parameter associated with each direction. For simplicity, we ignore this distinction as the two weights are almost always identical.

A large IP network could have hundreds or even thousands of routers. Typically, users connect to such a network through lots of small "edge routers", where small is a relative term and refers to the amount and size of packets the device is capable of transmitting. Larger customers, such as big enterprises, typically connect to the IP network through large edge routers. Often, many small edge routers in a region may be aggregated through a large edge router in the same region. Other routers, called hub or aggregation routers are used to further aggregate traffic from edge routers in a region. The hub routers then feed the aggregated traffic to a small number of core routers. The core routers are the biggest routers in the network and are typically situated in most major cities. They are connected to each other using a mesh topology. The IP network thus appears like a hierarchy of routers. At the top of the hierarchy is a flat level of core routers in a meshed topology. In each geographic region, there is a vertical stack of routers with the smallest edge routers at the bottom and the hub routers at the top of the stack connecting into one or a few core routers in that region.

The core routers are all part of OSPF area zero. The core routers are typically very large routers with multiple high-speed OC192 and OC768 links between them. The edge routers in a region are all grouped into an OSPF "area one" with a unique area id greater than zero. Often, the edge routers are further segregated by service into different area ones. The connectivity within an area one is generally like a vertical tree. Small edge routers connect to one or two large edge routers. Large edge routers connect to one or two hub routers and, in turn, hub routers connect to two core routers. Traffic from one large edge router to another large edge router does not flow on a direct link and instead must pass through a hub router or a core router or both routers. In OSPF, paths are chosen without explicitly taking the sizes of links into account. Hence, if routers of different sizes are placed in a flat topology, then a path may include links (out of the smaller routers) with insufficient bandwidth to handle the IP traffic on this path, resulting in packet drops.

The hub router need not be as large as a core router and has smaller size (up)links to the core as compared to the links within the core, with just one or two pairs of OC192 or 10 GigE uplinks in many cases. The hub router uplinks to the core can be included in OSPF area zero. It would be desirable to include hub routers in area zero, by designating some of their links to be area zero links, because area definitions would be simplified and it would be much easier to provision network links. However, there is a drawback when hub routers are included in area zero, which is that in certain conditions core traffic may be routed through the hubs and their area zero links.

In a normally configured OSPF network, links can be weighted to influence routing choices. The administrative weight of the hub uplinks to the core can be set high enough to discourage any traffic between two core routers from taking a route passing through the hub routers. This is a simple and usually preferred option. However, it suffers from one potential problem that makes network architects uneasy. There could be conditions, particularly under multiple failures and/or maintenance downtime scenarios, when core traffic is routed through these smaller size uplinks, overwhelming their capacity and resulting in a very large number of packet drops. Even if the network topology provides multiple paths for core traffic, one or more failures in the network could create a situation when many or all other alternate paths are unavailable. Because of this possibility, hub routers are not put in area zero.

The advent of new services and network configurations increases the difficulty of maintaining OSPF area zero traffic integrity. A service provider like AT&T offers many IP services such as Internet Access and different flavors of Virtual Private Network (VPN) service over separate edge routers. Edge routers are assigned to different OSPF areas according to the particular IP service they provide in a site. This creates a complicated situation where the core and hub routers have to be part of several OSPF areas. This situation is much more difficult to manage and is prone to router provisioning errors. This situation only becomes more complex in configurations where hub routers are dual-homed, e.g., to two core routers in two different locations.

One approach taken by the prior art to solve such problems is to engraft additional levels into the OSPF protocol, for example, to employ a three level approach. One drawback to these efforts is that they change OSPF procedures to such a large degree that they are tantamount to developing a brand new routing protocol. For example, the PNNI (Private Network to Network Interface) with a multi-level hierarchy was developed for ATM (Asynchronous Transfer Mode) networks. Even though PNNI has many OSPF-like features, it is a completely different protocol.

Most of the prior art and, in particular, the work done in the ASON (Automatically Switched Optical Network) and OIF (Optical Internetworking Forum) groups deals with the creation of a multi-level hierarchy spanning multiple networks or domains (within a network). The main intent of such solutions is to allow the networks to scale. The effort is directed towards creating a less detailed view as one goes up the hierarchy with lower levels offering summarized topology and reachable address information to higher levels. As an example, if many networks are connected to each other at interconnection points (over E-NNI links), then the highest level of the hierarchy could represent each network as a "node" with links between these "nodes" representing the E-NNI links. Routes in higher levels of the hierarchy are no longer "real" routes. At the highest level of the hierarchy, such a "logical" route may just specify the networks that are transited.

When a hierarchy is created and topology abstraction is used, the advertised topology can be a transformed view of the actual internal topology of a domain. There is no view of the actual internal topology of contained "Routing Areas" (synonymous to an OSPF area) and this may significantly affect routing performance.

All these prior art efforts effectively require a fork lift overhaul of the network protocols (i.e., a complete changeover with attendant hardware and software consequences) and as a consequence have never been used to upgrade existing networks.

Accordingly, there is a need to provide a method for accommodating routers of different sizes in a flat OSPF topology and routing traffic in an OSPF network so that, in breakdown situations, packets associated with area zero traffic will not be dropped. There is a further need to provide an OSPF network that is capable of operating in breakdown situations while avoiding dropping packets associated with area zero traffic. There is a further need to be able to upgrade existing OSPF-based networks to achieve such results without major turmoil, and preferably with only a new software release.

BRIEF SUMMARY OF THE INVENTION

The present invention is applicable to a single, existing, OSPF-based network and the idea is not to create a hierarchy for the purpose of scaling the network and accordingly no topology or address summarization is necessitated. Instead, the idea is to use a (pseudo) hierarchy designation to influence the calculation of real routes across the network. So, this invention uniquely provides a new way of partially achieving a three-level hierarchy in an existing OSPF network (in that the additional hierarchical level impacts only route and forwarding table calculation). Advantageously, unlike in other proposed three level hierarchies, in the present invention LSA flooding continues to use basic OSPF protocol constructs with the two-level OSPF flooding hierarchy and thus can be implemented without major protocol changes.

Briefly, the present invention is a method and system in which new hierarchical levels together with new routing restrictions are provided in an OSPF network for the purpose of controlling route calculation.

The present invention advantageously provides a way to include hub routers in OSPF area zero and effectively creates a two-level OSPF area zero for the purpose of imposing restrictions on routes used in area zero for forwarding packets. It explicitly prevents core router to core router traffic from ever using the uplinks from the hub routers.

In the standard OSPF protocol, in an OSPF area, nodes and links between nodes are by default of the same type. Shortest routes are used between nodes in an OSPF area.

In accordance with the present invention, the method and system define (and implement) at least two types of nodes and links in an OSPF area zero to handle the different requirements of core routers and hub or aggregation routers. Node types are assigned by network administrators and link types are derived from nodes type IDs. In determining the shortest route between two nodes, e.g., with the Djikstra algorithm, the set of eligible links is dependent on their node type IDs.

For example, in accordance with a specific embodiment of the present invention, we allow two types of nodes in OSPF area zero. The core nodes all have node_type=0. The hub node pairs in a site are given a unique node_type ID>0. ILinks$_{[i1]}$ between core nodes are assigned link_type=0. Links between a pair of hub routers and from those hub routers to core routers are assigned link_type=node_type ID of the hub routers. The (shortest) route between any two nodes is chosen from the set of links with link_type of the two nodes along with the set of links with link_type=0. This method calls for multiple invocations of the Dijkstra shortest path algorithm, once for each hub router complex, each time with a different set of pruned nodes and links (i.e., excluding nodes and links where links do not satisfy the condition that the links between the nodes have the route type of the node or link_type=0). Where the nodes are core routers, only links satisfying link_type=0 would be permitted. Thus, in accordance with the present invention, a path between two core routers determined according to these constraints is not allowed to go through hub routers under any circumstances, and the packet loss problem referred to above would not occur.

Currently OSPF has no designation of node type (in the way we are using this concept to distinguish core nodes from hub nodes) which means all nodes, by default, are of the same type in an OSPF area. (There is a node ID variable in OSPF, but one used for the unrelated purpose of naming and identifying a node.) One of the advantages of the present invention is that existing OSPF networks can be converted to the multiple node types required to accommodate routing based on node type according to the present invention through software enhancements, and it is a further advantage of the present invention that these required software enhancements are straightforward and manageable: (1) Routing Protocol OSPF is enhanced to accommodate the two node types. (2) The OSPF Link State Advertisements are also enhanced to distribute the node type information between routers. (3) The router provisioning processes are enhanced so that network administrators can provision the two node types. These changes are minor and fit easily within the OSPF protocol structure. The pruning of eligible nodes and links to those satisfying the conditions set forth in the previous paragraph can be accomplished by running a link and node pruning algorithm before the Dijkstra algorithm is run. Advantageously, no modifications to the Dijkstra algorithm are needed because Dijkstra just runs on a set of nodes and links and has no concept of areas. Dijkstra is only run to calculate paths within an area. It is fed the set of nodes and links from a single area at a time.

The present invention provides a unique solution that advantageously tackles a thorny routing problem in OSPF by incorporating the use of two node types within an OSPF area zero. Through the use of two different route types, the invention is able to make sure that core router to core router traffic can never be routed via hub routers even when both are in an OSPF area zero. As a consequence, use of the present invention prevents the limited hub uplink capacity from being overwhelmed by large core traffic volume, resulting in large packet losses.

Thus, the present invention is a marked improvement upon the only OSPF method currently available to avoid sending core traffic over uplinks from hubs, which is to use a relatively high administrative weight on the uplinks. As noted above, such a method is not foolproof and has the drawback that it fails to limit core traffic over uplinks in the presence of multiple network failures. The present invention will specifically prohibit this from happening.

A further advantage of the present invention is that the method of the present invention can be implemented in existing OSPF-based networks by substituting a new software release with the addition of node and link type definitions and a pruning algorithm based on node and link types, and thus is advantageous compared to prior multi-tier protocol revamps. Moreover, implementation of the present invention does not require changing the LSA flooding mechanism when creating the two node hierarchy, which is a major simplification from, and advantage over, a complete three-level or multi-level hierarchy approach.

A further advantage of the present invention is the network operating benefit that occurs when hub routers can be made part of OSPF area zero. Hub routers could then be homed to core routers in two different sites. This diverse hub router homing has significant advantages in terms of latency and cost over the current method which is to home to the same site with a pair of diversely routed uplinks. The present invention accommodates such complex configurations and yet controls traffic effectively through the use of multiple node types and route types in a single OSPF area.

These and other objects, advantages and features of the invention are set forth in the attached description.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE INVENTION

Figure 1:
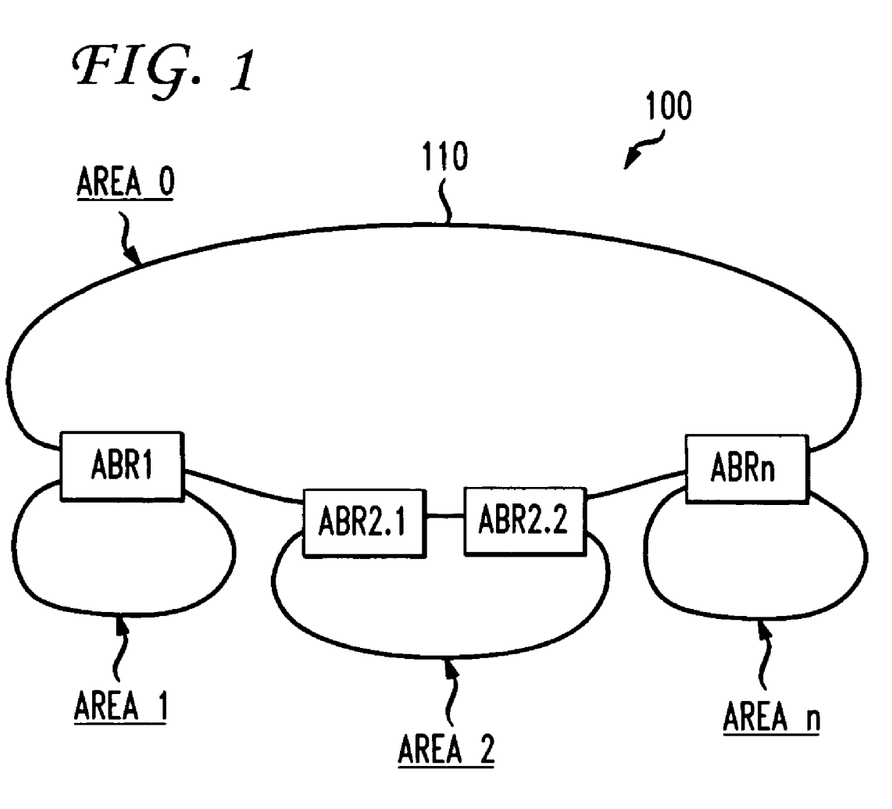
FIG. 1 is a diagram of an existing OSPF network.

FIG. 1 illustrates schematically a simple OSPF topology. As shown in FIG. 1, an IP network 100 has an area zero 110 containing core routers (not shown) and multiple area ones shown as Area 1, Area 2 and Area n containing edge routers (not shown). Area border router ABR1 connects area zero with Area 1, ABR2.1 and 2.2 connect area zero with Area 2, and ABRn connects area zero with Area n. In typical fashion, the nodes and links in each area have routes calculated by the Dijkstra algorithm, and link state advertisements (LSAs) are flooded to the nodes in the area to form tables used in calculating the shortest paths between origin and destination nodes.

Figure 2:
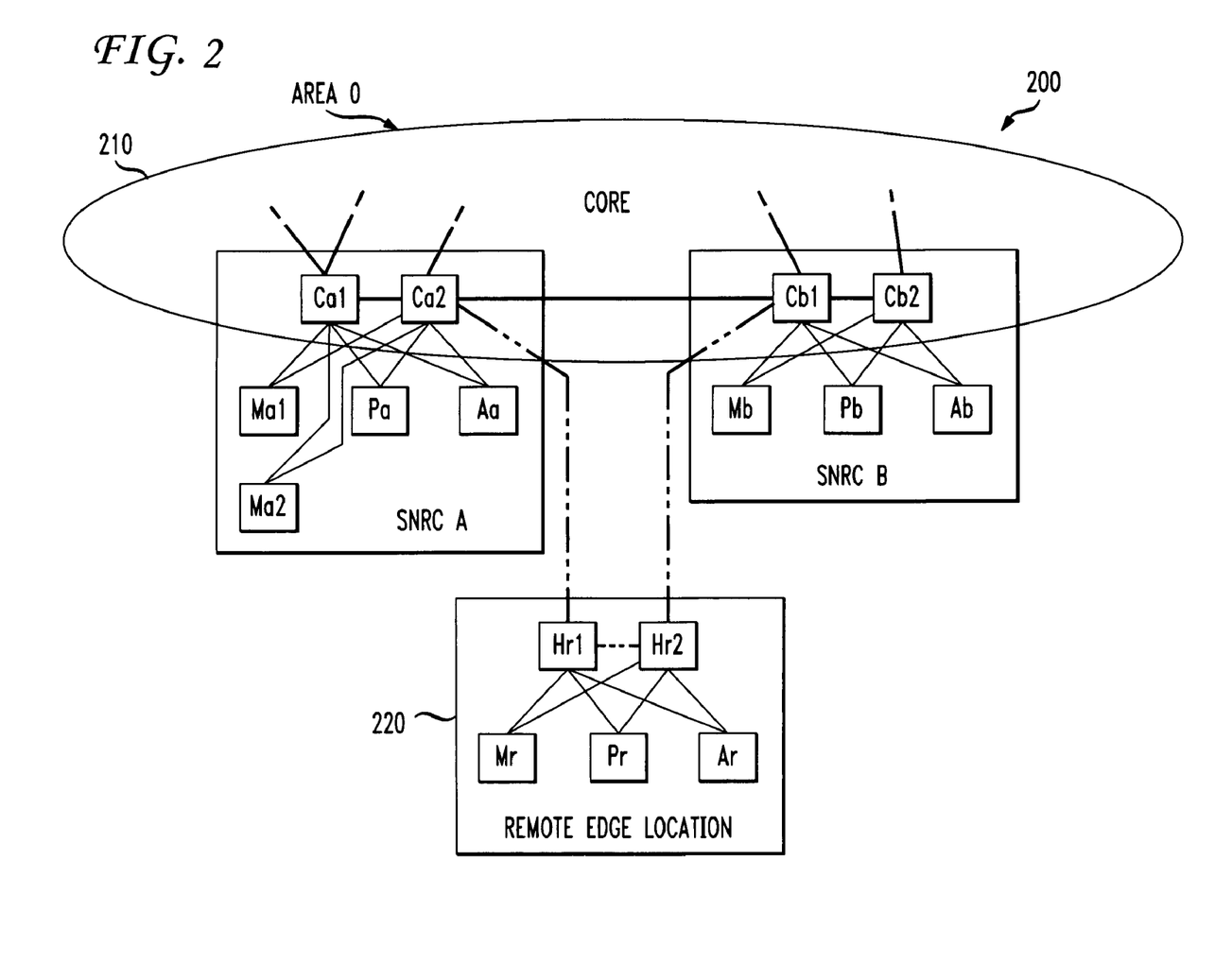
FIG. 2 is a diagram of another existing OSPF network with edge routers assigned to different OSPF areas.

FIG. 2 illustrates in greater detail the topology of an IP network 200 with a more complex arrangement using hub or aggregation routers that may accommodate a variety of IP services on the network. As shown in FIG. 2, the network 200 has an area zero 210 with two Service Node Routing Complexes (SNRCs) labeled SNRC A and SNRC B. SNRC A includes core routers Ca1 and Ca2 resident in area zero 210, as well as service routers Ma1 and Ma2, Pa and Aa. SNRC B includes core routers Cb1 and Cb2 resident in area zero 210, and service routers Mb, Pb and Ab.

As further shown in FIG. 2, network 200 includes a remote edge location 220 with hub or aggregation routers Hr1 and Hr2, and service routers Mr, Pr and Ar.

The service routers in SNRC A, SNRC B and remote edge location 220 may be, for example, Internet Service edge routers (Ma1 and Ma2, Mb, Mr), first VPN Service edge routers (Pa, Pb, Pr) and second VPN Service edge routers (Aa, Ab, Ar).

As illustrated in FIG. 2 by means of the solid lines interconnecting the various router elements, the routers are connected by links for transmitting data packets and other information. The links, such as the OC192 and OC768 links referred to previously, form the traffic paths between routers and are specified by network architects to supply the needed capacity for anticipated traffic. In the embodiment illustrated in FIG. 2, the service routers in SNRC A are linked to each of the two core routers Ca1 and Ca2 and the service routers in SNRC B are linked to each of the two core routers Cb1 and Cb2. The service routers in remote edge location 220 are linked to each of the two hub routers Hr1 and Hr2.

Core routers Ca1 and Ca2 are linked to each other, as are core routers Cb1 and Cb2. Core router Ca2 links to core router Cb1, and the core routers have additional links to other core routers (not shown) in area zero 210. Hub routers Hr1 and Hr2 are linked to each other, and to a core router.

As shown, hub router Hr1 is linked to core router Ca2 and hub router Hr2 is linked to core router Cb1. Thus in the configuration shown in FIG. 2, the hub routers in remote edge location 220 are dual-homed, e.g., to two core routers in two different locations. This arrangement, with hub routers outside area zero, but dual-homed, leads to the problems for OSPF routing that were previously mentioned, i.e., routing is difficult to manage and prone to router provisioning errors. Addressing this problem by placing the hub routers in area zero for OSPF routing purposes leads to the problem of lost packets if, in accordance with OSPF practice, hub uplinks may be required to carry core to core traffic in conditions where core links may be out of service.

Figure 4:
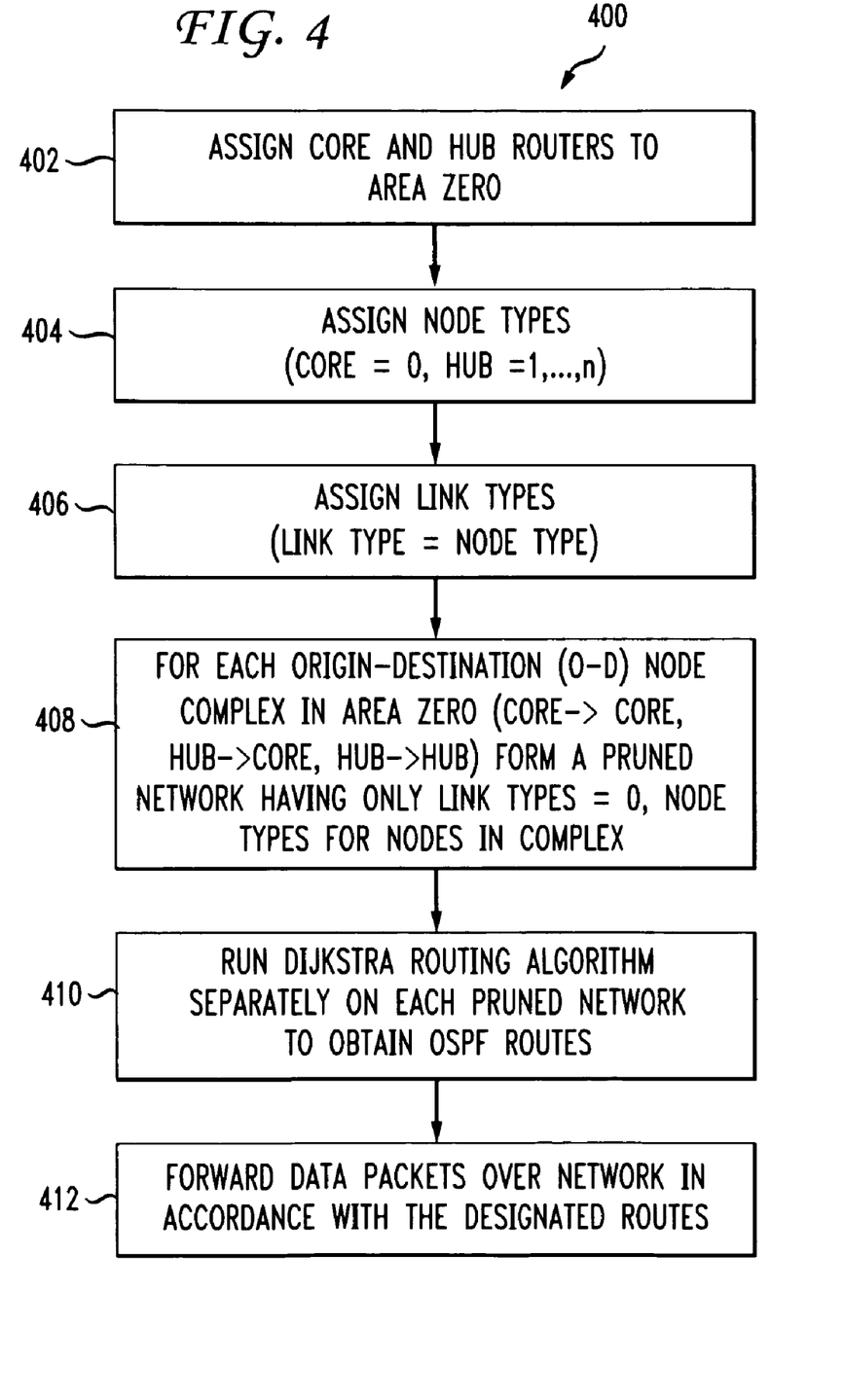
FIG. 4 is a flowchart showing a method performed by an OSPF network according to the invention.
Figure 4A:
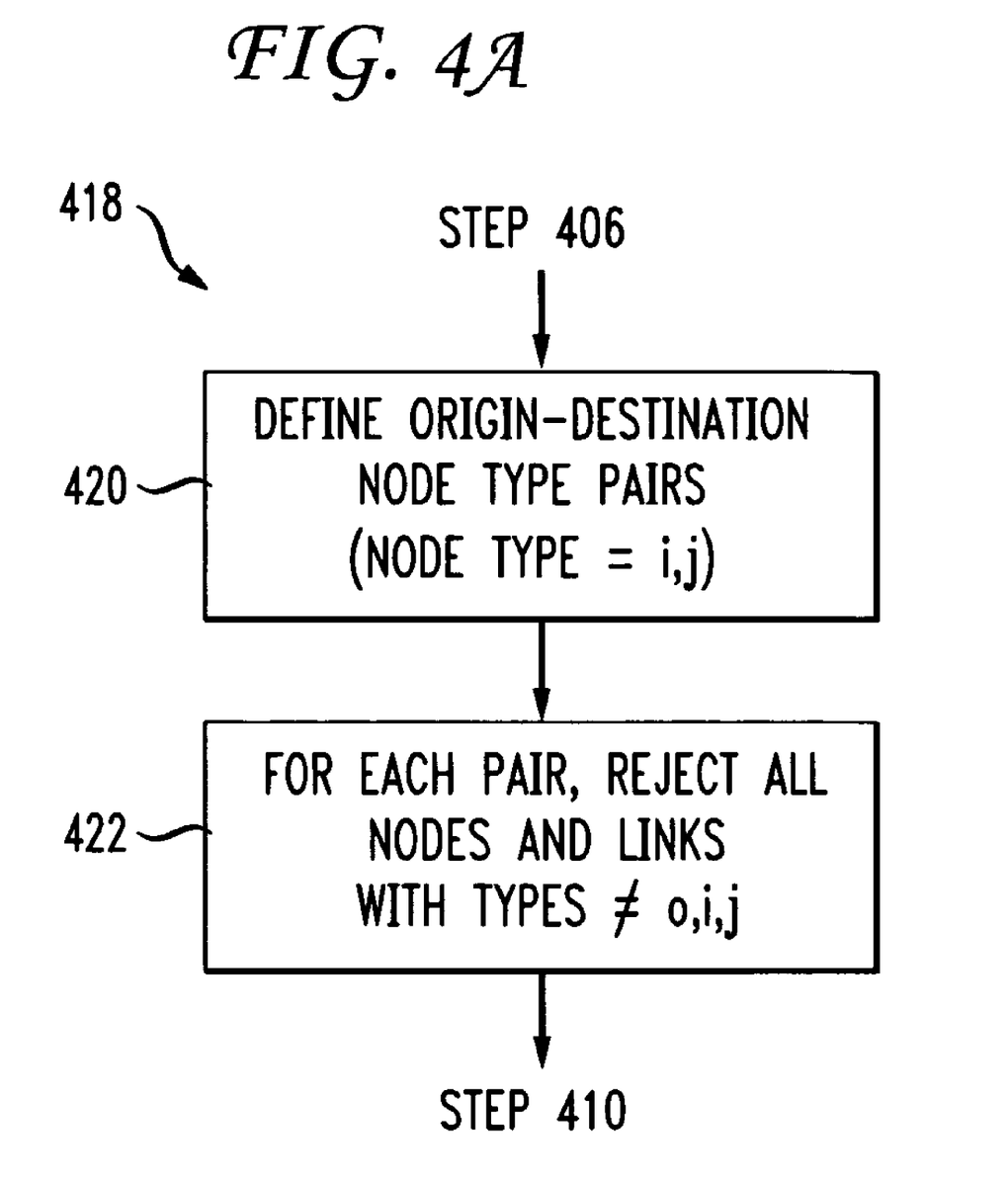
FIG. 4A is a flowchart showing a method for creating pruned networks (such as the pruned networks of FIGS. 3A, 3B and 3C) which are utilized in the method of FIG. 4.
Figure 5:
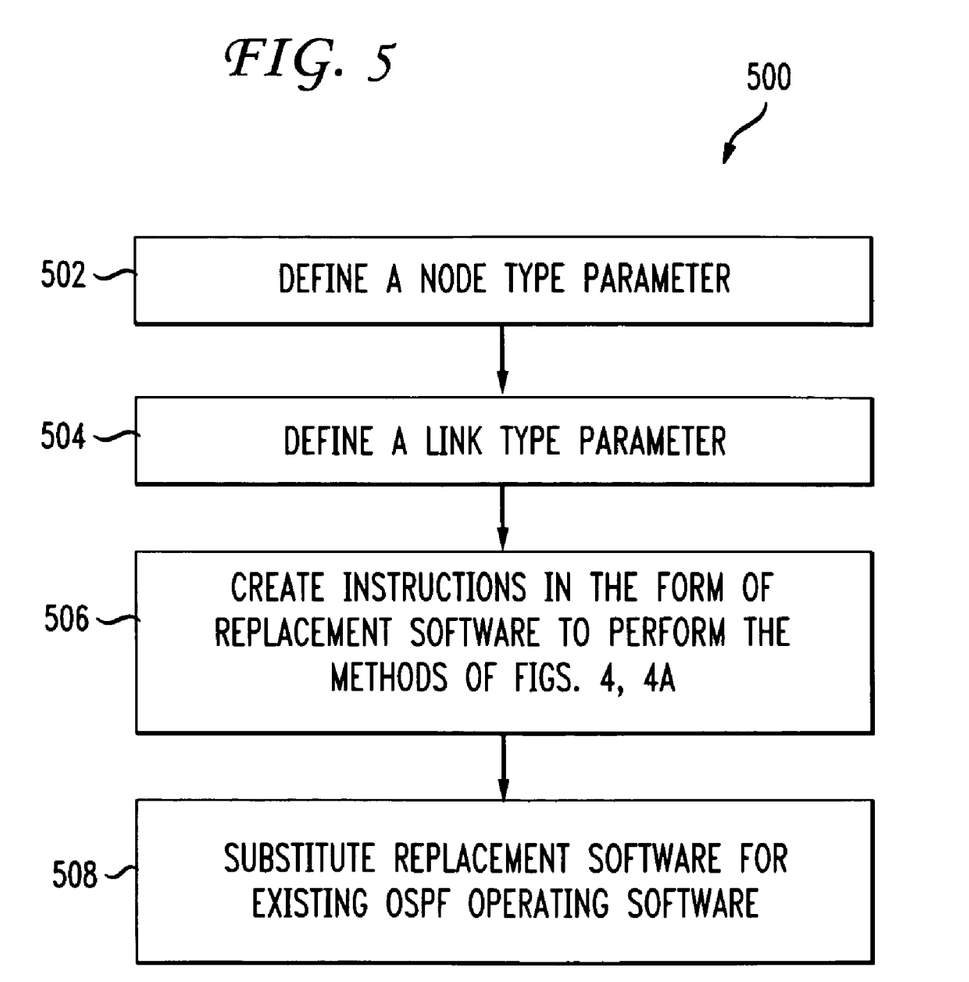
FIG. 5 is a flowchart showing a method for upgrading an existing OSPF network according to the invention.

A simple and easily implemented solution to this dilemma is provided by the present invention. The operation of the present invention is illustrated in the network shown in FIGS. 3, 3A, 3B and 3C. The methods of the present invention are shown in FIGS. 4, 4A and 5.

Figure 3:
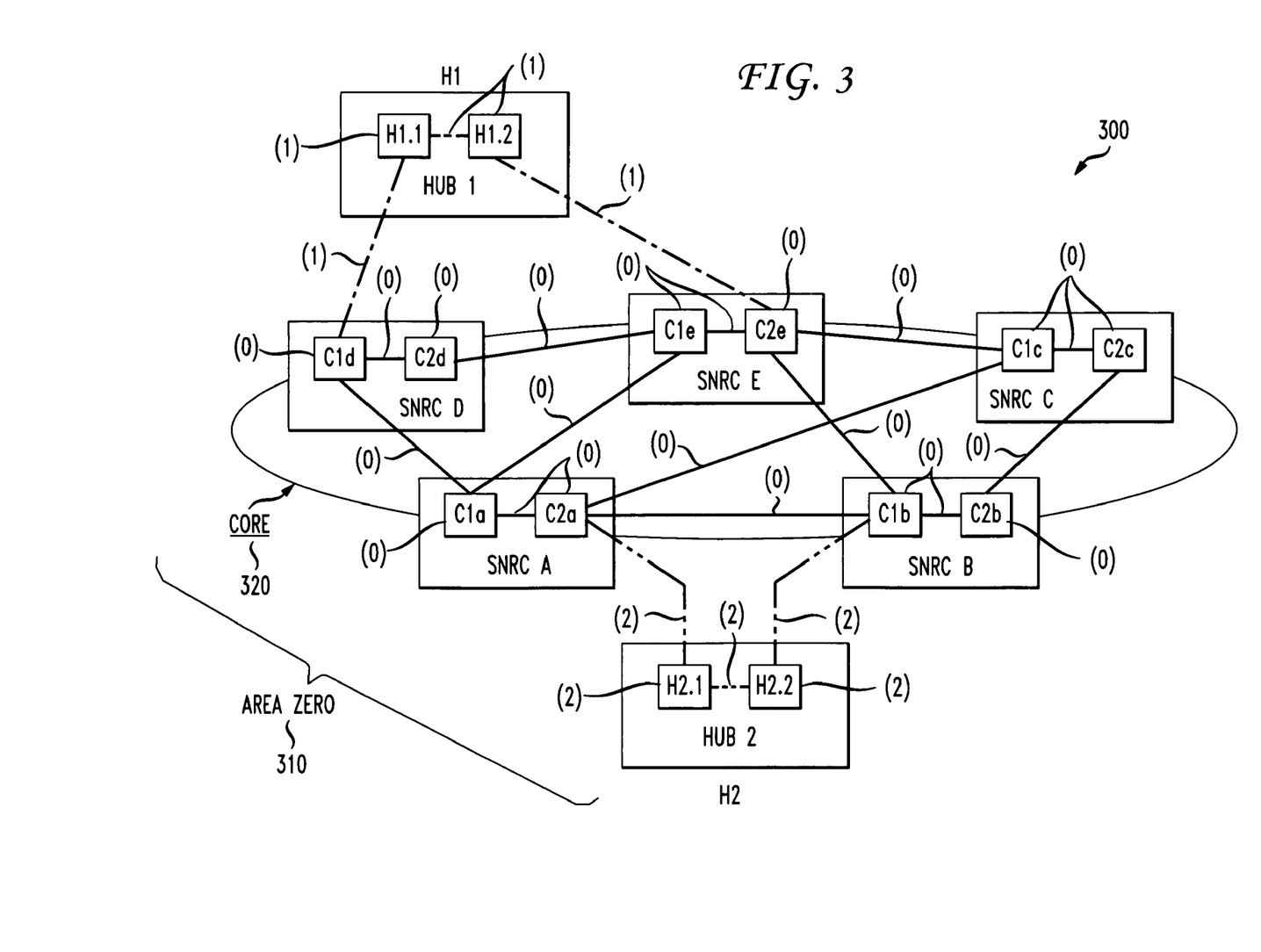
FIG. 3 is a diagram of an embodiment of an OSPF network with area zero configured according to the invention.

FIG. 3 shows a network 300 in which core routers C and hub routers H all are assigned to OSPF area zero 310. The core routers C reside in SNRCs A, B, C, D and E, and all core routers C are in the core 320. (Core routers Ca1 and Ca2 are in SNRC A; core routers Cb1 and Cb2 are in SNRC B; and so forth.) The hub routers H1.1 and H1.2, and H2.1 and H2.1 are in hub locations H1 and H2 respectively, which locations may be remote from the core or adjacent to it. As explained previously with reference to FIG. 2, the core and hub routers typically will be downlinked to a variety of edge routers (omitted from FIG. 3 for clarity). Data links between the core routers C and hub routers H are as shown illustratively by connecting lines in FIG. 3. As will be understood by those skilled in the network arts, the number, location and capacity of routers and links are determined by network design considerations.

Using OSPF topology terminology, each router is a node and each data connection between routers (nodes) is a link.

In accordance with the invention, each node in area zero is assigned a node type by a network administrator:
 a. Core nodes are assigned node type=0
 b. Hub nodes are assigned node type=1, 2, . . . n to correspond to the separate hub or hub complex through which packets may be routed.

Thus in the example of FIG. 3, the core nodes C all have node type=0, and the hub nodes H1.1 and H1.2 in hub location H1 are assigned node type=1, while the hub nodes H2.1 and H2.2 in hub location H2 are assigned node type=2. It will be appreciated that the numbers assigned to the nodes in this example are arbitrary, so long as the core nodes, and individual hub nodes, each have different numbers or characters assigned to them. For simplicity in this example, we assign 0 to the core nodes and numbers unequal to 0 to the hub nodes.

Next, in accordance with the invention, each link is assigned a link type to match the node type:
 a. Links between core nodes are assigned link type=core node type=0
 b. Links connecting to a hub and links between the hub nodes in a hub location are assigned link type=hub type Thus in the example of FIG. 3, hub nodes H1.1 and H1.2 are connected to core nodes C1d and C2e through links with link type=1, and connected to each other also through a link with link type=1; similarly, hub nodes H2.1 and H2.2 are connected to core nodes C2a and C1b through links with link type=2 and connected to each other though a link with link type=2. Using these assignments, node types and link types are shown in FIG. 3 in parentheses next to the node or link.

Figure 3A:
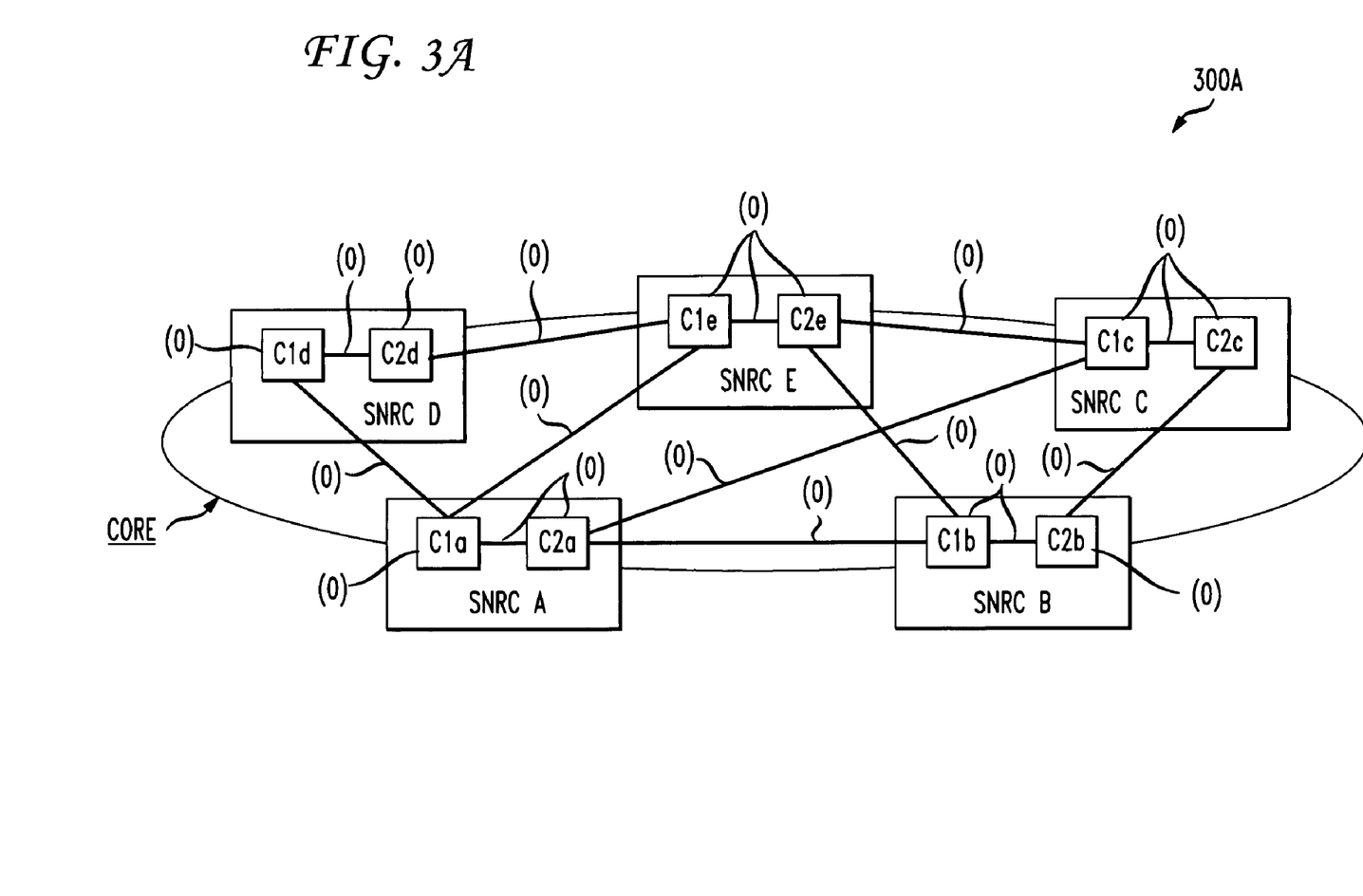
FIG. 3A is a diagram of a first pruned network for routing calculation for the embodiment of the invention shown in FIG. 3.
Figure 3B:
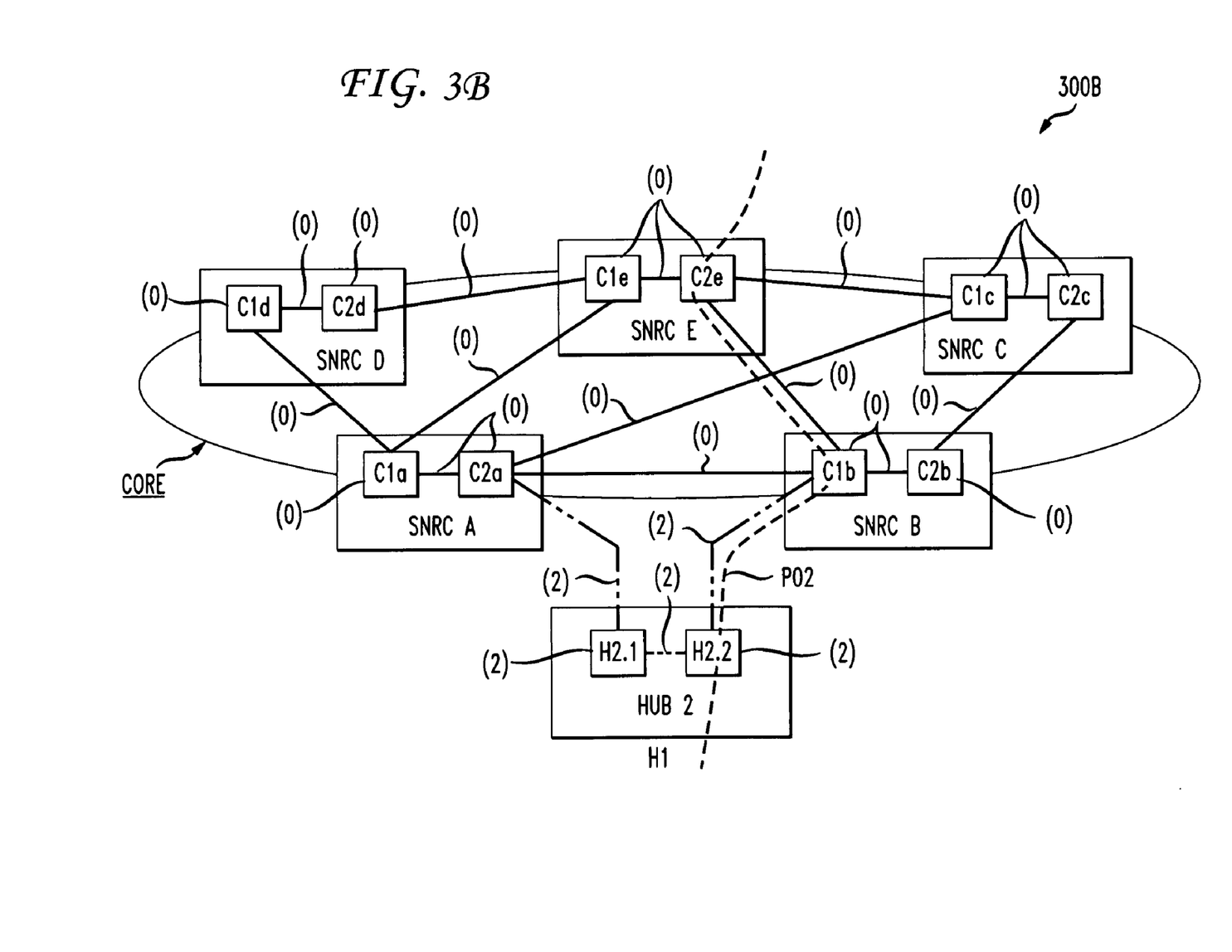
FIG. 3B is a diagram of a second pruned network for routing calculation for the embodiment of the invention shown in FIG. 3.
Figure 3C:
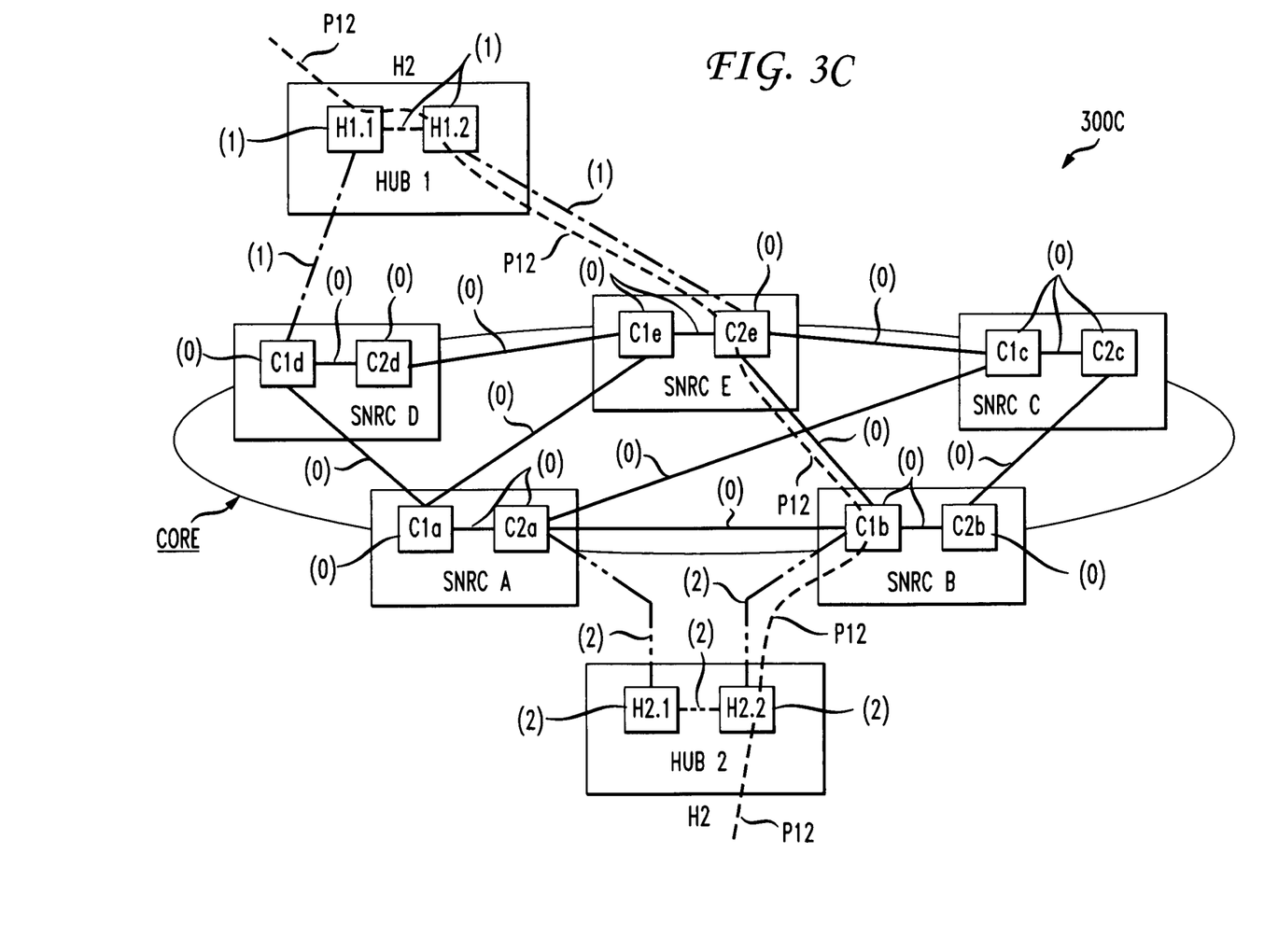
FIG. 3C is a diagram of a third pruned network for routing calculation for the embodiment of the invention shown in FIG. 3.

The node types and link types are then used to determine which nodes and links are eligible to carry different classes of traffic. In accordance with the present invention, this is done by creating a pruned network based upon the origin and destination nodes of traffic which is then used to calculate OSPF routing. FIGS. 3A, 3B and 3C provide examples of such pruned networks for three types of traffic.

FIG. 3A illustrates the portion 300A of the network 300 of FIG. 3 remaining after pruning of elements ineligible for traffic between two core nodes. For traffic between core nodes, both origin and destination nodes have node type=0. Pursuant to the invention, only network elements which satisfy core node type=0 and link type=0 remain in the pruned network. The Dijkstra routing algorithm is run on the pruned network 300A of FIG. 3A, and the resulting routing solutions are stored for forwarding data packets between core nodes.

FIG. 3B illustrates the portion 300B of the network 300 of FIG. 3 remaining after pruning of elements ineligible for traffic between hub location 2, such as hub H2.2, and a core node. Origin and destination nodes are either 0 or 2. Pursuant to the invention, only network elements which satisfy node type=0, 2 and link type=0, 2 remain in the pruned network. A possible path for such traffic is shown by the dashed line P02. The Dijkstra routing algorithm is run on the pruned network 300B of FIG. 3B, and the resulting routing solutions are stored for forwarding data packets between a hub node and a core node.

FIG. 3C illustrates the portion 300C of the network 300 of FIG. 3 remaining after pruning Of elements ineligible for traffic between hub location 2, such as hub H2.2, and hub location 1, such as hub H1.2. Origin and destination nodes are either 1 or 2. Pursuant to the invention, only network elements which satisfy node type=0, 1, 2 and link type=0, 1, 2 remain in the pruned network. A possible path for such traffic is shown by the dashed line P12. The Dijkstra routing algorithm is run on the pruned network 300C of FIG. 3C, and the resulting routing solutions are stored for forwarding data packets between hub nodes.

Each node in an OSPF area needs to calculate a route to all other nodes in that area. In the prior art, a single run of the Dijkstra algorithm yields the shortest paths from the chosen source node to all other (destination) nodes in the area. In accordance with the present invention, paths are calculated to the set of core nodes and each set of hub nodes one-by-one, each time using the method according to the invention for pruning the nodes and links.

From the foregoing examples, it can be seen that the use of pruned networks by the present invention to develop routing solutions has several advantages. First, it allows hubs to be included in OSPF area zero, with all the advantages that provides. Second, by constraining the Dijkstra routing algorithm to operate on a pruned network which excludes hub uplinks for all core node to core node traffic, packet losses arising as a result of routing traffic over hub links do not occur. Third, the invention is one whose methods may be easily engrafted onto existing OSPF protocols with the simple addition of a type definition to node and link descriptions, the addition of a pruning algorithm based on node and link types to create the pruned networks available for defined classes of internode traffic (core to core, hub to core, hub to hub for all separate hub identities) that the network topology permits, and then the application of the familiar Dijkstra routing algorithm on the pruned networks to develop OSPF routing solutions (which may in turn be used as input to other protocols such as the MPLS protocol). In many cases, the present invention may be adopted through a new release of software for operating existing networks.

The method 400 of the present invention is shown schematically in FIG. 4. In step 402, core and hub routers are assigned to OSPF area zero. In step 404, node types are assigned to the core and hub routers as follows: core nodes are assigned node type=0; hub nodes are assigned node types=1, 2, n to distinguish them from core types and from each other. Typically, node types will be assigned by network administrators who have determined the function of the individual network elements.

In step 406, link types are assigned to the links between nodes as follows: links between core nodes are assigned link type=0; links to a hub node are assigned link types=hub node types (i.e., if a hub node has type=2, a link to that hub node also has type=2). Link types may be assigned by network administrators, or may be calculated using a simple software algorithm based on the node types of the nodes the link joins.

In step 408, for each identifiable origin-destination (O-D) node complex in area zero on which traffic may be routed (i.e., core to core, hub1 to core, core to hub2, hub1 to hub2, $hub_i$ to $hub_j$, etc.) the method proceeds by forming a pruned network having only node and link types which=0 and the node types for the origin and destination nodes (i.e., types 0, 1 for hub1 to core traffic; types 0,1,2 for hub1 to hub2 traffic, etc.). The pruned networks may be formed by using a pruning algorithm or method operating on the assigned network node and link types, such as the method shown in and described with reference to FIG. 4A.

In step 410 in FIG. 4, the method proceeds by running the Dijkstra (or comparable) routing algorithm separately on each pruned network to obtain OSPF routes.

In step 412, data packets in the network are forwarded in accordance with the designated routes. No core to core packet loss will occur due to diversion of traffic over hub links and at the same time processing advantages will result from including hubs in area zero.

FIG. 4A illustrates schematically a simple method 418 for creating the pruned networks of step 408 of FIG. 4. In step 420 of FIG. 4A, origin-destination node pairs for potential traffic are defined for the network (e.g., core to core, hub to core, hub to hub, etc.). For simplicity, an origin-destination node type pair is given as node type=i, j. Either i or j or both i and j could take a value of zero.

The method proceeds in step 422 to reject or prune all nodes and links with types not equal to i or j or 0 (or equivalently, to identify nodes and links with types equal to i or j or 0). After pruning (or identifying) in accordance with step 422 the method returns to step 410 of FIG. 4, which runs the Dijkstra algorithm on the pruned network.

FIG. 5 shows schematically a method 500 for converting an existing OSPF network to one that uses the method of FIG. 4. In step 502 a node type parameter is defined and in step 504 a link type parameter is defined. In step 506 a set of software instructions is prepared to perform the methods of FIG. 4 using the node types and link types which may be assigned to network elements in area zero. In step 508 the software instructions prepared in step 506 are substituted for a network's existing OSPF software. Because the method of FIG. 4 is one that lends itself to adoption by means of a new software release, it may be adopted with relative ease, and without the expense and delay of major hardware and software revamping.

Thus, the invention describes a feature enabling a network utilizing OSPF protocols to include hub routers in area zero without the risk of packet loss arising from routing over hub links. The improved feature includes both system and method aspects. While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiments disclosed, but that the invention include all embodiments falling within the scope of the appended claims.

What is claimed is:

1. A method for managing routing in an IP network arranged for OSPF routing with an area zero including core routers and hub routers, comprising
   for each node linked to a core router, establishing at least two separate hierarchical levels of node signatures;
   assigning one of the at least two node signatures to each node based on whether the node is one of the core routers or one of the hub routers;
   assigning link signatures based on node signatures;
   requiring certain link signatures for routing certain internode traffic by:
      identifying node types of the certain internode traffic;
      identifying links with types which match the node types, the identifying of links resulting in a set of identified links and non-identified links; and
      designating the identified links as available and the non-identified links as unavailable;
   running OSPF routing algorithms for separate origin-destination network segments, the separate origin-destination network segments handling core to core traffic, hub to core traffic, and hub to hub traffic, based on the designated available node and certain link signatures to return OSPF routing for the separate origin-destination network segments; and
   routing traffic over the IP network based on such OSPF routing,
   whereby the traffic will not be routed over links not designated as available during conditions of IP network breakdown.

2. The method as claimed in claim 1 wherein the OSPF routing algorithm is a Dijkstra algorithm.

3. The method as claimed in claim 1 wherein the assigning comprises assigning a first node signature to core nodes, and a different node signature to other nodes.

4. The method as claimed in claim 1 wherein links from hub routers are designated as unavailable for routing core to core traffic.

5. A system for managing routing in an IP network arranged for OSPF routing with an area zero including core routers and hub routers, comprising
   for each node linked to a core router, means establishing at least two separate hierarchical levels of node signatures;
   means for assigning one of the at least two node signatures to each node based on whether the node is one of the core routers or one of the hub routers;
   means for assigning link signatures based on node signatures;
   means for requiring certain link signatures for routing certain internode traffic, including:
      means for identifying node types of the certain internode traffic;

means for identifying links with types which match the node types; the identifying of links resulting in a set of identified links and non-identified links; and means for designating the identified links as available and the non-identified links as unavailable;

means for running OSPF routing algorithms for separate origin-destination network segments, the separate origin-destination network segments handling core to core traffic, hub to core traffic, and hub to hub traffic based on the designated available node and certain link signatures to return OSPF routing for the separate origin-destination network segments; and means for routing traffic over the IP network based on such OSPF routing, whereby the traffic will not be routed over links not designated as available during conditions of network breakdown.

6. The system as claimed in claim 5 wherein the OSPF routing algorithm is a Dijkstra algorithm.

7. The system as claimed in claim 5 wherein the means for assigning comprises means for assigning a first node signature to core nodes, and a different node signature to other nodes.

8. The system as claimed in claim 5 wherein the means for designating unavailable links designates links from hub routers as unavailable for routing core to core traffic.

9. A method for transforming a standard OSPF network having an existing set of OSPF software instructions for obtaining routing solutions for forwarding data packets in the network into an enhanced-performance network in which core and hub nodes are assigned to OSPF area zero and core to core traffic is prevented from being routed over links connecting to hubs, comprising defining a node type signature with multiple values, defining a link type signature with multiple values, substituting for the existing set of OSPF software instructions a new set of software instructions which perform the following steps:

identifying core nodes with a first node type signature value, identifying hub nodes with node type signature values different from the first signature value, identifying links with link type signature values based on the node type signature values of the nodes to which they are connected, for each origin-destination node pair in area zero on which traffic may be routed, forming a pruned network with only those nodes and links which include (i) core nodes and links and (ii) those hub nodes and links with signature values which match the signature values of the origin and destination nodes, running a routing algorithm separately on each pruned network to obtain routing solutions for forwarding data packets, storing the routing solutions in the network, and forwarding data packets through the network in accordance with the stored routing solutions determined by the new set of software instructions, and implementing the new set of software instructions in the network to obtain routing solutions for forwarding data packets in the network, whereby in the transformed network traffic between core nodes will not be routed over links connecting core nodes to hub nodes.

10. The method as claimed in claim 9 wherein the routing algorithm is a Dijkstra algorithm.

11. The method as claimed in claim 9 wherein links are identified with a first signature value if they are connected only to core nodes and, if they are connected to a hub node, they are identified with the signature value of the hub node.

12. The method as claimed in claim 9 wherein links from connecting to hub nodes are designated as unavailable for routing core to core traffic.

13. The method as claimed in claim 9 wherein forming a pruned network including hub nodes and links comprises identifying the node signature values of the origin-destination node pair;

identifying the links with signature values which match the identified node signature values; and designating the identified links as available and the non-identified links as unavailable for routing traffic between the origin-destination node pair.

* * * * *